United States Patent [19]

Wayman

[11] 4,098,148

[45] Jul. 4, 1978

[54] TRANSMISSION CONTROLS

[75] Inventor: Robert William Wayman, Bloomfield Hills, Mich.

[73] Assignee: Borg-Warner Corporation, Chicago, Ill.

[21] Appl. No.: 748,625

[22] Filed: Dec. 8, 1976

[51] Int. Cl.$^2$ .................. B60K 41/18; F16H 3/74
[52] U.S. Cl. .................. 74/863; 74/752 C; 74/781 R; 74/868
[58] Field of Search ........... 74/781 R, 752 C, 863, 74/864, 865, 868

[56] References Cited

U.S. PATENT DOCUMENTS

| 2,242,519 | 5/1941 | Frank | 74/781 R X |
|---|---|---|---|
| 2,319,226 | 5/1943 | Griswold et al. | 74/781 R X |
| 2,399,097 | 4/1946 | Carnagua | 74/781 R |
| 2,807,968 | 10/1957 | Forster | 74/781 R |
| 3,126,765 | 3/1964 | Conkle | 74/781 R |
| 3,334,530 | 8/1967 | Lamburn et al. | 74/781 R |
| 3,631,741 | 1/1972 | Kelbel | 74/781 R |
| 3,744,348 | 7/1973 | Lemon | 74/869 |

*Primary Examiner*—Samuel Scott
*Assistant Examiner*—Lance W. Chandler
*Attorney, Agent, or Firm*—Robert L. Zieg

[57] ABSTRACT

A control mechanism for a planetary overdrive gear mechanism for an automatic transmission which utilizes a double-acting one-way clutch with a clutch controller to immobilize the cage for the one-way clutch to allow inner and outer races to rotate relative to one another and a brake mechanism for the inner race of the clutch which is integral with the sun gear of the gear mechanism. The control mechanism includes a servomotor to activate the controller, a servomotor to operate the brake mechanism, a shift valve responsive to vehicle speed and throttle position to actuate the servomotors, and an interlock activated by the controller servomotor operative to prevent fluid actuation of the brake servomotor.

7 Claims, 6 Drawing Figures

3-4 SHIFT VALVE

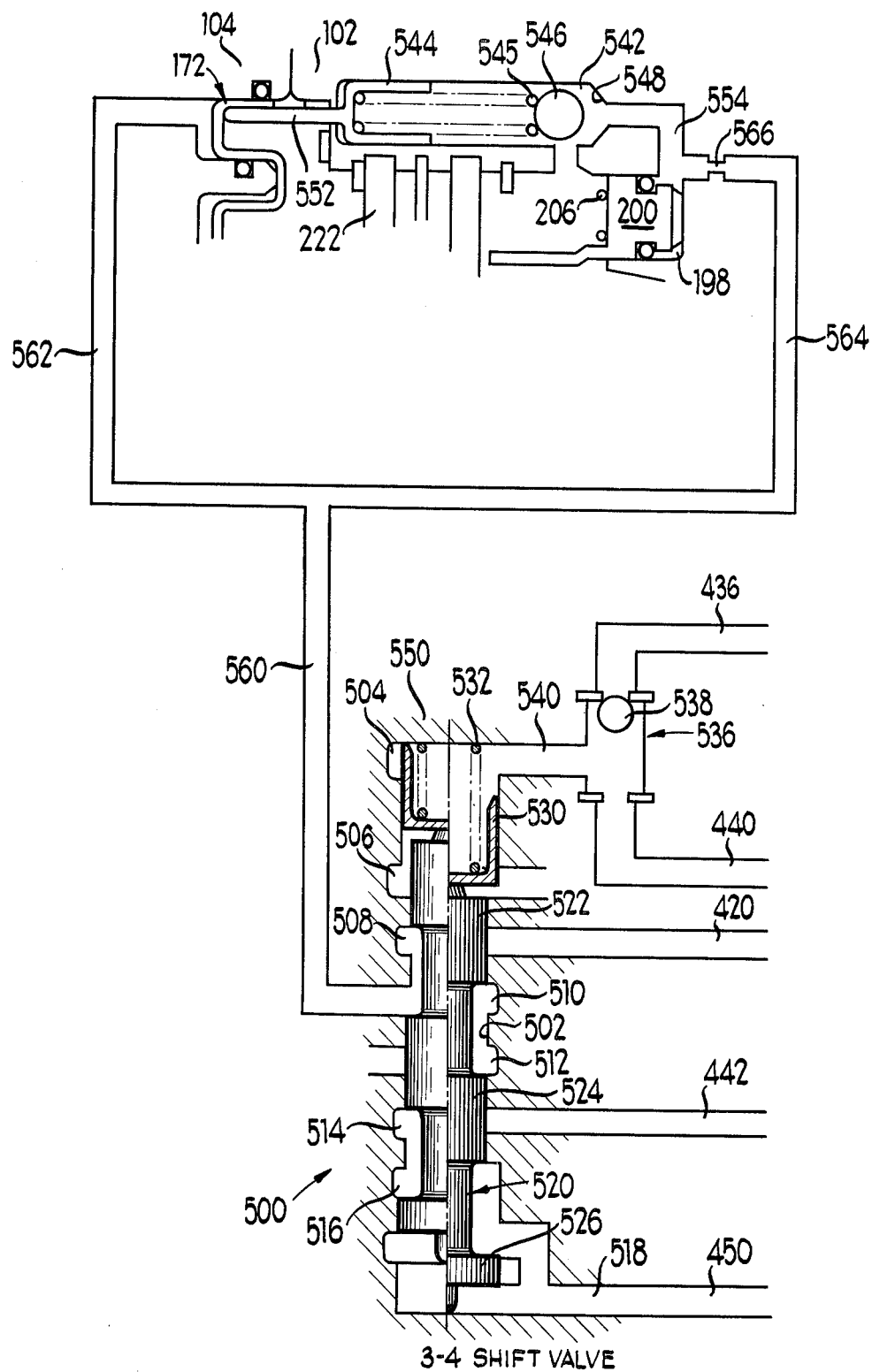

TRANSMISSION CONTROLS

BACKGROUND OF THE INVENTION

Various schemes have been developed in the field of automatic transmissions to provide an overdrive ratio. The overdrive ratio is desirable as an additional ratio for the advantages of fuel economy and flexibility in the ratio coverage available. Normal solutions to this problem, as recognized in the prior art, include overdrive gear sets added in series to the transmission structure which adds greatly to the space requirements, not only in the axial sense but also in the radial sense as compared to the transmission without the overdrive ratio. In addition, many of the prior art designs require the utilization of a friction brake for the overdrive ratio and a friction clutch for the locked-up condition of the overdrive gear set, the locked-up condition being required when the transmission is operating in ratios other than overdrive. When both a friction clutch and friction brake are utilized, difficulties are encountered in shifting into and out of the overdrive ratio since a hydraulic timing problem exists to insure a smooth shift from the previously established ratio into the overdrive ratio and, likewise, a smooth down-shift from the overdrive ratio to a lower drive ratio. Further, additional friction clutches as normally required in an overdrive gear set require a rather significant amount of axial space within the transmission.

To summarize the state of the art with regard to addition of overdrive ratios in autmotic transmissions, the main problems are space problems, smooth engagement, and timing of the ratio changes into and out of overdrive ratio.

SUMMARY OF THE INVENTION

The present invention provides a planetary overdrive gear mechanism for use in an automatic transmission which obviates the above-enumerated difficulties of space requirements and the precise shift-timing difficulties usually encountered. The present invention utilizes a planetary overdrive gear set which has connected within it a one-way clutch mechanism between two elements of the planetary gear set. A unique control apparatus is provided which provides a means of immobilizing and centering the cage for the one-way clutch such that it can be neutralized allowing the two elements of the planetary gear set to rotate relative to one another and the one-way clutch being of the double-acting type wherein a direct drive is automatically obtained through the overdrive gear set when the control of the cage is inactivated to allow it to move freely.

In addition, the present invention provides an actuating mechanism for the cage control which comprises a hydraulic piston and chamber and an additional hydraulic piston and chamber for the friction brake mechanism utilized to establish overdrive ratio. The control mechanism includes a shift valve which is sensitive to vehicle speed and throttle position of a vehicle to control operation of the hydraulic servomotor for the cage control and the brake control. A unique hydraulic-mechanical interlock mechanism is provided wherein engagement of the brake mechanism is impossible until such time as the actuator for the cage control has neutralized the cage of the one-way device. This unique arrangement includes a mechanical connection for the piston of the cage control and a check valve structure which will allow buildup of pressure in the brake servomotor only when the piston for the cage control is in its position holding the cage in its neutral condition.

The present invention is suitable for use with a hydraulic control system for an automatic transmission as disclosed in U.S. Pat. No. 3,744,348, of common assignee. The control system described herein is illustrated and usable with the overdrive mechanism as disclosed herein and as particularly described and claimed in applicant's copending application Ser. No. 748,626, filed 12/8/76. However, it is to be understood that the inventive controls herein could be utilized with other forms of overdrive transmission mechanisms wherein a pair of hydraulic servomotors are used to vary ratios between a direct one-to-one drive and an overdrive ratio.

BRIEF DESCRIPTION OF THE DRAWINGS

FIG. 6 is a schematic view of a control mechanism for the transmission of FIGS. 1 and 2.

TRANSMISSION MECHANISM

Figure 1:
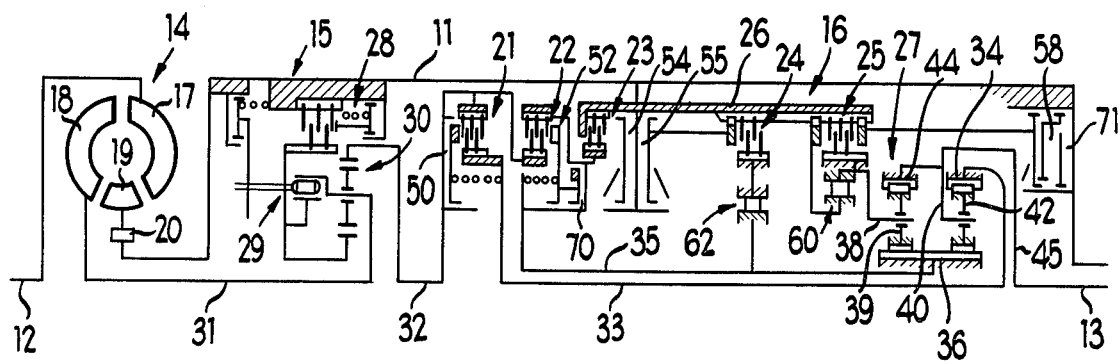
FIG. 1 is a schematic view of a planetary automatic transmission incorporating an overdrive gear mechanism.

Referring to FIG. 1, a transmission mechanism 10 providing four forward ratios and reverse driving ratio is schematically illustrated. This transmission includes a transmission casing 11, an input shaft 12, an output shaft 13, a torque converter mechanism 14, a first or overdrive gear section 15 and a second or lower ratio gear section 16. The torque converter mechanism 14 includes an impeller member 17, a turbine member 18 and a stator member 19 connected with a one-way brake mechanism 20. Rotatably fixed in the casing 11 is a stationary sleeve 21 which has incorporated therein several of the friction engaging mechanisms for the transmission mechanism.

Gear section 16 includes a pair of clutches 21 and 22, friction brake mechanism 23, 24 and 25 and a planetary gear set 27.

Overdrive gear section 15 includes a friction brake mechanism 28, a double-acting one-way clutch 29 and a planetary gear set 30.

An intermediate shaft 31 connects turbine 18 with gear set 30. An intermediate shaft 32 interconnects planetary gear set 30 with clutches 21 and 22. An intermediate shaft 33 connects clutch 21 with an annulus gear 34 in gear set 27. An intermediate shaft 35 interconnects clutch 22 with a double sun gear arrangement 36 in gear set 27. Planetary gear set 27 further includes a planetary gear carrier 38 having planetary pinions 39 journalled thereon and a planetary carrier 40 having planetary pinions 42 journalled thereon. The planetary pinions 42 mesh with the annulus gear 34 and the sun gear 36. There is further provided an annulus gear 44 meshing with planetary pinions 39. A member 45 connects annulus gear 44 and carrier 40 with output shaft 13.

A hydraulic servomotor 50 is provided for clutch 21. Hydraulic servomotors 52 and 70 are provided for clutch 22. A hydraulic servomotor 54 is provided for friction brake 23 and a hydraulic servomotor 55 is provided for friction brake 24. Hydraulic servomotors 58 and 71 are provided at the rear of the transmission casing 11 for friction brake 25. A one-way brake 60 is provided for the planetary carrier 38; a one-way brake 62 is provided between friction brake 24 and intermediate shaft 35.

Figure 2:
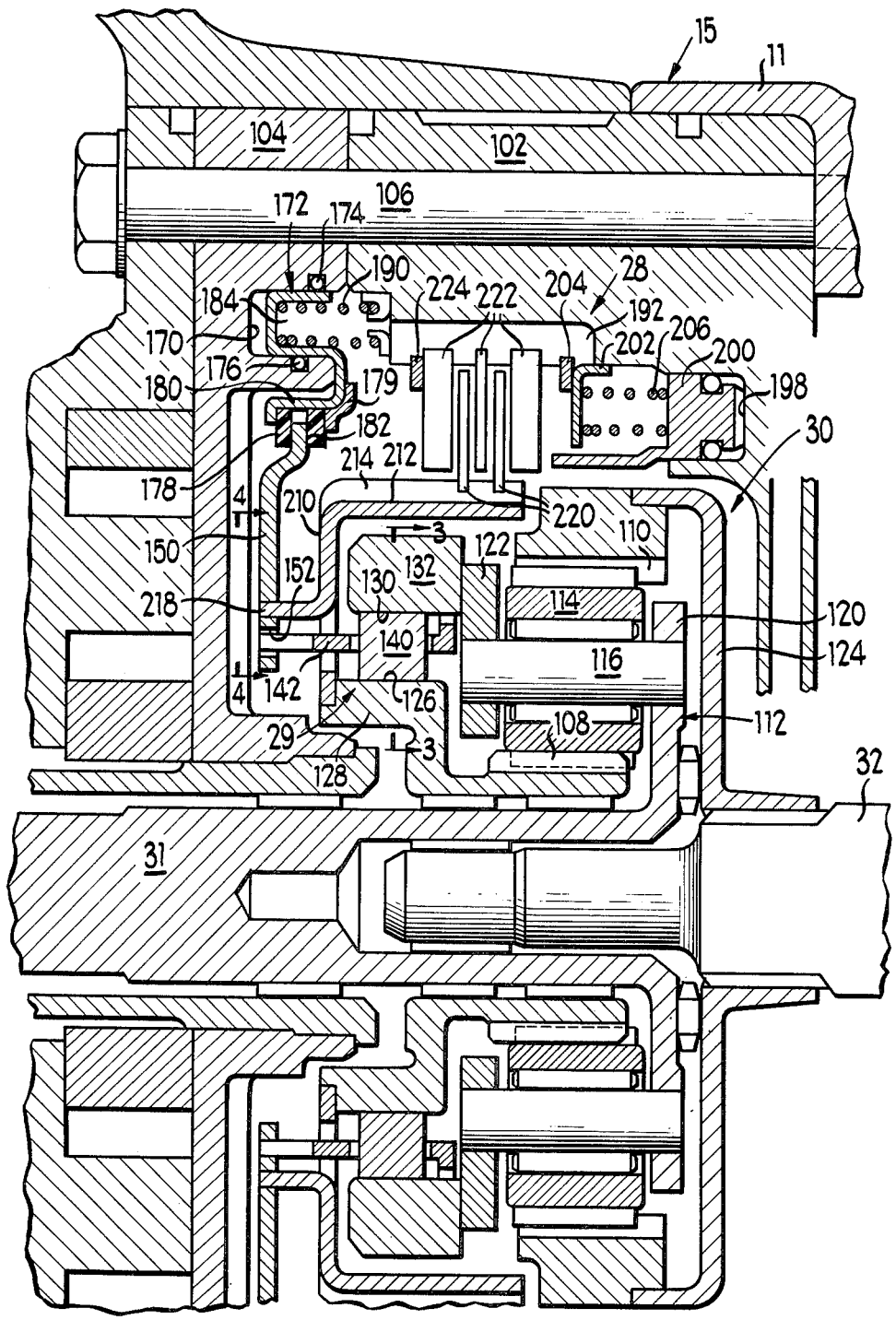
FIG. 2 is an enlarged sectional view through the overdrive gear mechanism.

Operation of the transmission mechanism as described above and relating to the schematic showing in FIG. 2 is as follows: with clutches 21 and 22 disengaged, a neutral condition is established.

Low or first ratio is established by application of clutch 21 connecting shaft 32 with input shaft 12 via gear set 15 and torque converter 14 thereby driving annulus gear 34 in the forward direction. The planetary carrier 40 is output shaft 13 thereby providing a forward drive of the output shaft 13 at a reduced speed; one-way brake 60 holding planetary carrier 38 to provide a reaction element for the planetary gear set. A manual first-speed drive ratio similar to the one-way drive just described may be provided by engagement of the low coast brake 25 by means of hydraulic servomotor 58 holding planetary carrier 38 against rotation in either direction thereby establishing a two-way drive through the planetary gear set.

Second drive ratio is provided by clutch 21 remaining engaged and engagement of friction brake 24 by hydraulic servomotor 55 thus holding the sun gears 36 stationary. Under these conditions, a higher speed forward drive is provided by the planetary carrier 40 driving input shaft 12 at a reduced speed with one-way brake 62 being made effective to hold sun gears 36 stationary establishing a one-way drive connection for second speed. Optionally, an intermediate or second coast brake 23 may be applied to hold shaft 35 against rotation in either direction to provide a two-way second-speed drive ratio.

Third-speed drive ratio is provided by clutch 21 remaining engaged and clutch 22 being engaged by hydraulic servomotor 70 thereby locking shafts 33 and 35 together, locking up the planetary gear set and providing a one-to-one direct drive ratio of the output shaft 13.

Reverse drive ratio is established by engagement of clutch 22 and engagement of friction brake 25. With the sun gear 36 being driven in a forward direction and planetary carrier 38 held stationary, annulus gear 44 and thereby output shaft 13 are driven in the reverse direction.

The operation of the gear section 16 to provide first, second, third and reverse driving ratios as described above is in accord with conventional practice for automatic transmissions. More particularly, as described in U.S. Pat. No. 3,744,348 of common assignee, the detailed description of the transmission in that patent is incorporated herein by reference. However, the present invention adds overdrive gear section 15 to the transmission described above in a novel and advantageous manner. Briefly, the operation of the overdrive gear section 15 is that when brake 28 is applied with shaft 31 driving the planetary gear set 30, the shaft 32 driven by planetary gear set 30 will be driven at an increased speed or an overdrive ratio. Brake 28 is applied normally after the third ratio has been established in gear section 16 providing one-to-one ratio through gear section 16. However, it is also to be understood that brake 28 may be applied to establish an overdrive ratio through gear section 15 when second ratio is established in gear section 16 to establish an additional speed ratio between normal second and third speed ratios. Thus, the overall ratio provided with brake 28 applied is an overdrive ratio providing expanded ratio coverage for the transmission. When brake 28 is released, the one-way clutch 29 is activated for operation in either direction, essentially locking up the gear set 30 and allowing for normal operation of gear section 16 providing the three forward speeds and reverse. The operation and structure of overdrive section 15 is later described in detail.

Servomotor 52 for clutch 22 has the adjoining smaller servomotor 70 such that the clutch can be applied using only servomotor 70 alone or by both servomotors 52 and 70, as will be later described. Servomotor 58 has adjoined thereto second servomotor 71 whereby the brake 25 may be engaged by either servomotor 58 alone or by both servomotors 58 and 71, as will be later described.

Referring to FIG. 2, an expanded view of the gear section 15 is given. Provided in the casing 11 is a reaction plate 102 and a cylinder plate 104 secured in casing 11 by bolts 106, for example.

The planetary gear set 30 includes a sun gear 108, an annulus gear 110 and a planetary carrier 112 having a plurality of pinion gears 114 rotatably mounted on pins 116 in carrier 112. Pinion gears 114 mesh with sun gear 108 and annulus gear 110. Planetary carrier 112 further includes a radial flange 120 receiving pins 116 on one side of the gear set and a radial flange 122 receiving pins 116 on the other side of the gear set. Flange 120 is formed on intermediate shaft 31. Annulus gear 110 includes a radial driving flange 124 drivingly connected to intermediate shaft 32.

Figure 3:
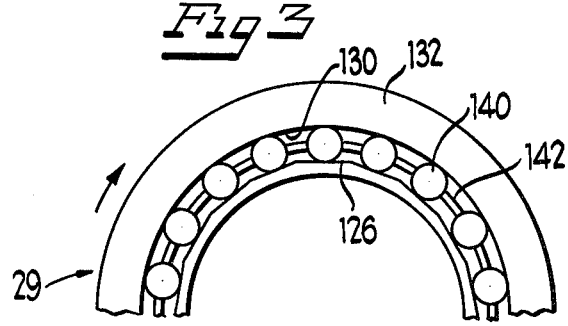
FIG. 3 is a cross-sectional view taken along the lines 3—3 of FIG. 2.

One-way clutch 29 is of the double-acting type particularly described in U.S. Pat. No. 3,631,741 of common assignee. Referring to FIGS. 2 and 3, one-way clutch 29 has an inner race 126 comprised of a series of cams formed on an axially extending drum 128 integral with sun gear 108. One-way clutch 29 also includes an outer race 130 comprising a smooth cylindrical surface formed on the internal diameter of an annulus member 132 which is secured to flange 122 on carrier 112. One-way clutch 29 futher includes a series of rollers or wedging elements 140 carried by a cage member 142 within a series of pockets 144 in the cage member as shown in FIG. 5.

Figure 4:
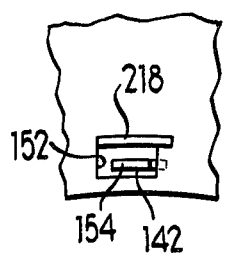
FIG. 4 is a partial sectional view taken along the lines 4—4 of FIG. 2.

Cage member 142 is adapted to be controlled to provide for proper operation of the gear section 15, and there is provided a control flange 150 for this purpose. Control flange 150 includes a series of apertures 152 as shown in FIGS. 4 and 5. Provided on cage member 142 is a series of tangs 154, each having an angular surface 156. As will be described during operation of gear section 15, the control flange 150 may be in a position as illustrated in full lines in FIG. 5 in which the cage member 142 is free to rotate or move arcuately in either direction and allow operation of the one-way clutch 29 to provide a driving connection between races 126 and 130 in both directions of relative rotation.

Figure 5:
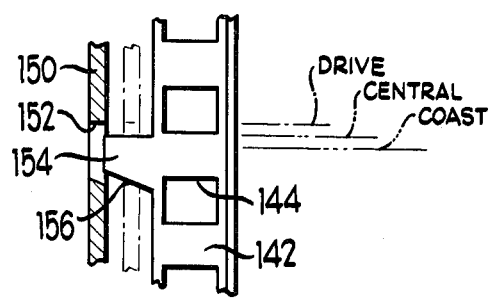
FIG. 5 is a segmented view showing details of the one-way clutch cage.

In the position of the control flange 150 illustrated in dotted lines in FIG. 5, flanges 154 are received within apertures 152 the relationship between the tangs 154 and apertures 152 serving to control cage 142 as required. Also, referring to FIG. 5, three relative positions of cage 142 with respect to apertures 152 are indicated, these are "Central," "Drive" and "Coast" positions of the cage indicated by a line representing the upper edge of tangs 154. The "Drive" position is the position the cage will try to assume when the engine is driving the wheels and the gear set is conditioned for overdrive. The "Central" position is the centralized position of the cage in which the rollers not engage or wedge between the cam surfaces 126 and the race 130. The "Coast" position is the position the cage will tend to move when the vehicle wheels are attempting to drive the engine as when the throttle is released and the gear set is conditioned for overdrive operation.

In the overdrive condition of the control flange 150 illustrated in dotted lines in FIG. 5 wherein cage 142 is shown in the "Central" position, the one way clutch is to be "neutralized" or in effect conditioned such that it will not interfere with the drive relationship through the gear set 30. If the cage 142 were free to rotate in the clockwise direction (the direction of the arrow in FIG. 3) then the one-way clutch 29 could lock up the gear train 30 making the overdrive set 30 inoperative, and this condition is to be prevented. However, cage 142 can be allowed to go into the counterclockwise direction as viewed in FIG. 3 without any problems since the rollers cannot lock in this direction due to the fact that the rotational speeds of the gear set components of the gear set 30 are such that the race 130 will be rotating faster than the cam surfaces 126 in the clockwise direction, thus preventing the one-way clutch from locking up. Therefore, in the overdrive position of control flange 150 the openings 152 permit movement of the cage 142 in the counterclockwise direction away from the central position toward the drive direction as illustrated in FIG. 5, but prevents movement of the cage from the central position in a clockwise direction toward the coast position.

The reason for permitting movement of the cage toward the drive position as illustrated in FIG. 5 when the cage is conditioned for overdrive and not allowing it to move to its coast position, is to allow smooth ratio changing from third to fourth and fourth to third ratio during periods when the engine is driving the wheels (power-on). For example, in third when the engine is transferring torque to the wheels the cage will be in its drive position and not central. When the control calls for a shift to overdrive as will be explained later, then the control flange 150 can move to the overdrive position without restriction. As the 3-4 ratio shift takes place sun gear 108 will be held stationary and one-way clutch 29 will overrun, the cage 142 then going to its central position and trying to go on into the coast position. However, the cage is restricted by the control flange 150 from going beyond the central position. On a "power-on" or engine driving the wheels fourth to third ratio change, the sun gear is released allowing the overdrive gear set 30, to be free. However, the cage 142 of one-way clutch 29 can move into the drive position regardless of the position of the control flange 150 and complete the drive and act as a coupling between shaft 32 and shaft 31.

In this manner "power on" up and down shifting between third and fourth ratio can be completed by taking over from the one-way clutch and eliminating any ratio changing jerkiness or timing problems.

Now considering the condition where the vehicle is coasting in third ratio that is when the vehicle is for example, going down a grade and the roller clutch has assumed the "Coast" position illustrated in FIG. 5, if the control calls for a third to fourth ratio change and the control flange 150 would stay in the full line position a lock up of the gear set 30 would occur when the brake 28 is engaged to hold sun gear 108 stationary. To prevent this condition the control flange moves into engagement with the tangs 154 on cage 142 and overdrive brake 28 cannot be engaged until the cage 142 moves to its cental position as illustrated in FIG. 5. This can be accomplished in either of two ways. Either a torque reversal can occur in which either the control flange quickly moves to its dotted or over drive position or sufficient force can be placed on the cage by the control flange 150 such that the roller clutch 29 is pulled from engagement and the cage is positioned for overdrive in this manner. Again, the brake 29 must be prevented from being engaged until the cage is in its overdrive positions, either "Central" or "Drive," as illustrated in FIG. 5. As explained above, however, after the cage is engaged by control flange 150 so that it can only be in the "Central" or "Drive" positions, the roller clutch 29 is then conditioned for "power on" down shifts as explained above.

The additional condition which must be considered is a coast down shift four to three ratio change. In this ratio change the cage 142 will have to move its "Coast" position to provide coupling of shafts in third ratio. When the overdrive brake 28 is released, releasing the sun gear, the control flange 150 can move readily to the full line position of FIG. 5 releasing cage 142 and only minimum force is required.

Provided in cylinder member 104 is an annular bore 170 in which is received a sheet metal piston 172. Annular O-ring seals 174 and 176 are provided to perfect a fluid seal between bore 170 and piston 172. Sheet metal piston 172 has a pair of non-metallic annular rings 178 received within an inner flange 180 and secured therein by a retainer 179. Retainer 179 is secured to piston 172 by welding or other suitable means such as rivets. The arrangement of non-metallic rings 178 allows control flange 150 to rotate relative to piston 172 within the area between rings 178.

The members 178 define a groove 182 therebetween receiving control flange 150. The members 178 are of plastic or other non-metallic material to facilitate rotational movement of plate 150 within groove 182. The piston 172 is relatively U-shaped providing an annular pocket 184. Received within the pocket 184 and extending between piston 172 and reaction plate 102 are coil return springs 190.

The friction brake mechanism 28 is comprised of a series of splines 192 formed on an internal diameter of reaction member 102. The reaction member 102 further includes an annular bore 198 which receives a piston 200 slidable within bore 198. A spring retainer 202 of annular shape is secured within reaction member 102 by snap ring 204. A series of coil return springs 206 extend between retainer 202 and piston 200 to return piston 200 to the position illustrated in FIG. 2. Secured to the drum 128 by electron beam welding or other suitable means is a sheet metal brake drum 210 having an axially extending portion 212 thereon, in which are formed a series of driving teeth or splines 214. The drum 210 includes a series of axially extending tangs 218 which are received within apertures 152 in control flange 150. Drivingly connected to drum 210 are a series of friction plates 220. Interspersed between the plates 220 are friction plates 222 which are drivingly connected to the splines 192 on reaction member 102. The plates 222 are secured in position by snap ring 224.

The operation of gear section 15 shown in FIGS. 1 through 5 as described above is that when brake 28 is released, the piston 200 being in a position shown in FIG. 2, and the control flange 150 in the position of FIG. 4, cage member 142 is released and drive from the shaft 31 will be transferred directly to shaft 32 at a one-to-one ratio since one-way clutch 29 will be free to drivingly connect sun gear 28 and planetary carrier 112. Gear section 15 is conditioned for overdrive operation, when piston 172 is activated by fluid pressure in bore 170 moving control flange 150 to the dotted line position of FIG. 5, thus centering cage 142 and holding rollers 140 in their neutral position. Piston 200 is moved to the left as viewed in FIG. 2, by fluid pressure in bore 198 which will provide a friction engagement of plates 220 and 222 holding drum 210 stationary. With drum 210 stationary holding sun gear 108 stationary one-way clutch 29 is neutralized and with carrier 112 being driven by shaft 31, ring gear 110 and shaft 32 will be driven by shaft 31, ring gear 110 and shaft 32 will be driven at an increased speed for overdrive ratio with respect to shaft 31. Thus, the gear section 15 will provide either a direct drive or an over drive ratio, depending upon operation of the control system of FIG. 6 as will be described controlling cage 142 and brake mechanism 28.

Control Mechanism

Referring to FIG. 6, the control mechanism for controlling the overdrive gear section 15 shown in FIGS. 1 and 2 is illustrated. The control mechanism includes a shift valve 500 connected to the regular control mechanism for an automatic transmission, and, in particular, the shift valve 500 shown in FIG. 6 to be connected in the control system shown in the above-mentioned U.S. Pat. No. 3,744,348, and the disclosure of the control mechanism of that patent is incorporated herein by reference. Referring to FIG. 6, the conduits 420, 436, 440, 442 and 450 connected to the shift valve 500 carry the same numerals as the corresponding conduits in U.S. Pat. No. 3,744,348. As described in U.S. Pat. No. 3,744,348, conduit 436 carriers the main line pressure as when the manual valve shown in the patent is in its "1" or "2" position for the purposes as will be described. Conduit 440 carries a throttle responsive pressure as described in the above-mentioned patent. Conduit 420 carries main line pressure for the transmission in all forward positions of the manual control valve. Conduit 442 carries kick-down pressure therein representing a pressure created when the throttle pedal for the vehicle is fully depressed. Conduit 450 carries governor pressure from the governor valve of the control system, thus carrying a pressure that varies with vehicle speed.

The valve 500 includes a bore 502 provided in a valve body 550 which would be a common valve body with the valve body 150 of U.S. Pat. No. 3,744,348. The bore 502 includes ports 504, 506, 508, 510, 512, 514, 516 and 518. Slidable within the bore is a valve stem 520 having lands 522, 524 and 526 thereon. A spring plug 530 is provided within the bore 502 which is cylindrical in shape and is acted upon by coil spring 532 extending between the end of the valve bore and the plug 530. The spring 532 and plug 530 create a force urging the valve stem to its lower position as illustrated in FIG. 6, this being its down-shifted or "3" position. Provided between conduits 436 and 440 is a check valve 536 having a check ball 538 therein; check valve 536 is connected to port 504 by conduit 540.

Provided for the actuating mechanism for the cage control 150 and brake mechanism 28 is a bore or passage 542 in member 102. The bore 542 has a piston member 544 slidable therein and includes a check ball 546 engageable with a seat 548. Piston member 544 has an extension 552 thereon which, as illustrated in FIG. 6, contacts piston 172. A fluid passage 554 is provided which connects with the bore 198 for piston 200 and to the check valve 546-548. A fluid passage 560 is provided connected to port 510 of the shift valve 500, the passage 560 carrying the pressure source to activate pistons 172 and 200. The fluid passage 560 has a branch 562 connected to piston 172 and a branch 564 connected to a piston 200. A fluid restriction 566 is provided in conduit 564 in connection with piston 200.

Operation of the Control Mechanism

The control mechanism illustrated in FIG. 6 operates to control the overdrive gear section 15 automatically in accordance with certain control signals in the transmission control system as will be described. The "3-4" shift valve 500 has a lower, down-shifted or "3" position, and an upper, up-shifted or "4" position, both positions being illustrated in FIG. 6. Conduit 420, as will be seen from the description in the abovementioned U.S. Pat. No. 3,774,378, carries main line pressure for the transmission controls. When valve stem 520 is in its "3" position, land 522 blocks conduit 420 at port 508.

Movement of valve stem 520 is controlled by the speed-responsive governor pressure in conduit 450 on one end thereof and by throttle pressure in conduit 440 or kick-down pressure in conduit 436 and spring 532 acting on the opposite end. As described in the aforementioned patent, there is provided in the control system "1-2" and "2-3" shift valves which are controlled by the same parameters as shift valve 500 and act in response to the governor speed-responsive pressure and throttle pressure to provide automatic shifting between first, second and third drive ratios, the third drive ratio being a lockedup one-to-one ratio in which clutches 21 and 22 are both engaged.

The sizing of the lands 526 and the area of the plug 530 are such as to insure that the governor pressure will be unable to produce adequate force on land 526 to induce the stem 520 to move up to the up-shifted position until after the "2-3" shift valve is in its up-shifted position and the transmission is in third or one-to-one drive ratio.

Assuming "3-4" shift valve 500 is in its down-shifted position with the valve stem 520 moved to its lower position illustrated in FIG. 6 as urged by the spring 532 as described, land 522 blocks line pressure from conduit 420 and no fluid pressure is admitted into conduits 560, 562, and 564. Thus, the condition of the gear section 15 is that the piston 172 will be moved to the left by the spring 190 moving control flange 150 to the full line position of FIG. 5 releasing cage 142 and thereby allowing one-way clutch 29 to provide a direct two-way drive between shaft 31 and shaft 32. Since at this time there is no pressure in conduit 564, piston 200 will be moved to the right by spring 206 disengaging brake mechanism 28 to allow the one-to-one drive through gear section 15.

When the combination of vehicle speed-responsive pressure and the throttle pressure is such that the valve stem moves to its up-shifted or "4" position, being the upper position as illustrated in FIG. 6, lines pressure in conduit 420 will flow through the groove between lands 522 and 524 through port 510 into conduits 560, 562 and 564. Initially, this will activate piston 172 to move control flange 150 to the dotted line position illustrated in FIG. 5 holding cage 142 to its "overdrive" position. Flange 150 will move to this full line position of FIG. 5 when conditions are proper as described above. Movement of piston 172 to the right as illustrated in FIG. 6 will act through piston 544 and spring 545 to move check ball 546 onto seat 548 blocking exhaust of fluid from passage 554 and allowing pressure buildup in bore 198. Thus, piston 200 will move to engage brake 28 and hold sun gear 108 stationary and establish an overdrive ratio through gear set 30 between shafts 31 and 32.

It is to be noted that the mechanism illustrated in FIG. 6 provides a unique mechanical hydraulic interlock between the control of the cage 142 and engagement of friction brake 28. As will be apparent, if the piston 172 has not moved to the right to a sufficient extent to restrict cage 142 to its overdrive ("Drive" and "Central") positions, the check ball 546 will not be seated by piston 544 and pressure buildup cannot take place in bore 198 and brake 28 cannot be engaged. This is essential since if the brake 28 can be engaged during the time that the cage 142 is released, providing a direct two-way drive between shafts 31 and 32 the brake 28 would be attempting to stop rotation of both shafts 31 and 32 which is, of course, improper operation, particularly at the vehicle speeds at which the overdrive gear section 15 is to be actuated to establish overdrive ratio. Further, the above interlock mechanism has the unique advantage that a pure hydraulic type timing of cage control and engagement of brake 28 is not used but a physical interconnection between piston 172 and the fluid passage 554 for actuation of piston 200 is provided insuring that the brake 28 cannot be engaged until piston 172 is properly positioned. This obviates operating difficulties which could occur with pure hydraulic timing and interlock mechanisms in which when the control system would operate improperly or if a line became plugged or other similar defective operation could provide a situation in which momentarily brake 28 would be engaged before the cage 142 is neutralized due to undesired pressure buildup in line 564.

I claim:

1. A control mechanism for an automatic transmission, said transmission including a high-speed drive section including a planetary gear set having a plurality of relatively rotating elements, a friction brake for one of said elements and a one-way clutch having a plurality of wedging means engageable between two of said elements, said clutch including a cage for said wedging means, a high-ratio shift valve in said control systems, a fluid actuated controller for said cage movable between positions where said cage is held in a controlled position and a position wherein said clutch will establish a one-to-one drive through said high-speed section, pressure signal means connected to said shift valve, said shift valve normally being urged to a position in which no fluid pressure is supplied to said controller or said brake and said clutch establishes a one-to-one ratio through said gear set, said shift valve moving in response to said pressure signal means to a position supplying pressure to said controller and said brake to hold said cage in the controlled position and engage the brake mechanism to establish a high-speed drive ratio through said high-speed section automatically, and fluid interlock means to prevent supply of pressure to said brake until said controller is in position controlling said cage.

2. A transmission control system as claimed in claim 1 wherein said interlock means is between said actuator for said controller and the pressure supply to said actuator for said brake.

3. A control mechanism as claimed in claim 2 wherein said interlock means comprises a check valve connected to said brake actuator and means connected to said controller and said check valve holds said check valve open and prevents buildup of pressure in said actuator until said controller has moved to its controlling position.

4. A control mechanism for a automatic transmission having a plurality of engageable devices which can be hydraulically actuated to establish particular drive ratios through the transmission, said transmission including a high-speed drive section including a planetary gear set having a plurality of relatively rotating elements, a friction brake for one of said elements and a roller clutch engageable between two of said elements, a high-ratio shift valve in said control system, a fluid actuated controller for said roller clutch movable between positions where said roller clutch is held in a controlled position and a position wherein said clutch will establish a one-to-one drive through said high-speed section, a speed-responsive pressure in said control system connected to said shift valve, a throttle position responsive pressure in said control system connected to the opposite end of said shift valve, said shift valve normally being urged to a position in which no fluid pressure is supplied to said controller or said brake and said roller clutch establishes a one-to-one ratio through said gear set, said shift valve moving at a predetermined vehicle speed and throttle pressure to a position supplying pressure to said controller and said brake to hold the roller clutch in the controlled position and engage the brake mechanism to establish a high-speed drive ratio through said high-speed section automatically.

5. A transmission control system as claimed in claim 4 wherein a fluid actuator is provided for said brake mechanism and for said controller interlock means between said actuator for said controller and the pressure supply to said actuator for said brake whereby said brake cannot be engaged until said controller is in its controlling position.

6. A control mechanism as claimed in claim 5 wherein said interlock means comprises a check valve connected to said brake actuator and means connected to said controller and said check valve whereby said check valve will prevent buildup of pressure in said actuator until said controller has moved to its cage controlling position.

7. A control mechanism as claimed in claim 6 wherein said fluid actuator for said controller includes a piston, said interlock including an extension member engageable by said piston and said extension member acting on said check valve in response to said piston.

* * * * *